3,448,113
Patented June 3, 1969

3,448,113
CERTAIN 2-HALO-3-PYRIDYL ANTHRANILS
Charles William Den Hollander, Midland Park, N.J., assignor to Hoffmann-La Roche Inc., Nutley, N.J., a corporation of New Jersey
No Drawing. Original application May 1, 1964, Ser. No. 364,298, now Patent No. 3,352,877, dated Nov. 14, 1967, which is a continuation-in-part of application Ser. No. 288,882, June 19, 1963. Divided and this application July 25, 1967, Ser. No. 655,773
Int. Cl. C07d 85/06
U.S. Cl. 260—296      4 Claims

ABSTRACT OF THE DISCLOSURE 2-halo-3-aryl anthranils and a method of preparing these compounds including intermediates in this process. The 2-halo-3-aryl anthranils are valuable intermediates in the preparation of therapeutically useful 1,4-benzodiazepines.

CROSS REFERENCE TO RELATED APPLICATION

This application is a divisional application of Serial No. 364,298 filed May 1, 1964 now Patent No. 3,352,877, in the name of Charles William Den Hollander, which is a continuation-in-part of Serial No. 288,882, filed June 19, 1963 now abandoned, in the name of Charles William Den Hollander.

DETAILED DESCRIPTION OF THE INVENTION

In achieving the objectives within the purview of the present invention, it has been discovered that if a p-halonitrobenzene and an arylacetonitrile are reacted to form an anthranil, and if the resulting anthranil is subjected to reduction in the presence of a novel catalyst consisting essentially of palladium and iron, a good quality 2-aminophenyl aryl ketone is obtained in high yield.

The process described above is illustrated graphically in the following diagrammatical flow sheet, wherein A is selected from the group consisting of pyridyl and

and R is selected from the group consisting of hydrogen and halogen. While "halo" and the like as used in the flow sheet is intended to connote all four forms thereof, in an advantageous aspect, chlorine or bromine is preferably employed as the halogen atom.

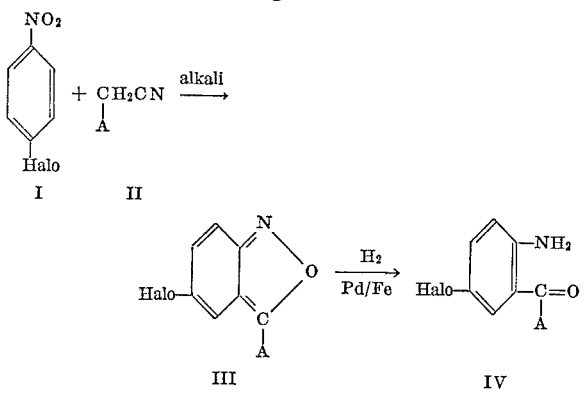

The first stage of the reaction, i.e. the preparation of Compound III from Compounds I and II, proceeds preferably in the presence of an inert organic solvent. Representative of such solvents are alcohols, for example, lower alkanols such as ethanol and methanol and ethers, for example lower alkyl ethers such as methyl ethyl ether and ethyl ether. Preferred are lower alkanols. It is essential that a base be present during this stage. Any suitable base may be employed. However, an alkali metal hydroxide such as sodium hydroxide is advantageously utilized. During the first stage, it is preferable that the temperature be maintained below about 30° C. The product of Formula III need not be isolated prior to reduction, but in a preferred aspect, the product is preferably isolated from the reaction mass by treatment with water and methanol in a manner set out hereinafter.

Compounds of Formula III above wherein A is pyridyl, i.e. compounds of the formula

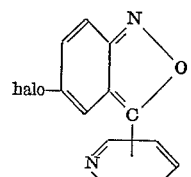

are novel and, thus, constitute a part of the present invention. In a preferred aspect, when A is pyridyl, the pyridyl group is joined to the anthranil nucleus at the α-position thereof.

In the second stage of the process (i.e. the formation of Compound IV above from a compound of Formula III above), a novel catalyst is employed which comprises, as the sole catalytic components, palladium metal in combination with a substrate selected from the group consisting of iron hydroxides, iron carbonates, iron basic carbonates and mixtures thereof, the gram atomic proportion of the palladium to the iron being in the range of from about 3 to about 8 g. atoms of palladium to about 1 g. atom of iron.

It has been found that effective catalysts for use in the second stage of the process of the present invention can be prepared by a process which consists essentially of adding a palladium-containing compound and a ferric-containing compound to an aqueous medium in an amount such that the resultant solution contains palladous ions and iron ions in the proportion of from about 3 to about 8 g. atoms of palladium to about 1 g. atom of iron and subjecting the said solution to the action of an alkaline material and a reducing agent. Although any proportion included within the limits set out above may be efficaciously employed in the invention, in a preferred embodiment a solution containing as the sole essential catalytic forming materials palladous and iron ions in the proportion of from about 4 to about 6 g. atoms of palladium to about 1 g. atom of iron, more preferably from about 5 g. atoms of palladium to about 1 g. atom of iron is utilized. As substances capable of functioning at a reducing agent in the process for preparing the catalysts useful for the purposes of the present invention can be included such as alkali metal formates, alkaline earth metal formates, aqueous solution of formaldehyde, elemental hydrogen in aqueous medium and mixtures thereof. In a preferred embodiment, sodium formate is employed. The amount of reducing agent employed is not critical, but it is preferable to utilize the reducing agent in such amount whereby all of the palladous ions present in the aqueous solution are reduced to palladium metal. Thus, in the preferred aspect of the present invention, the reducing agent is employed in a slight excess over the theoretical amount required to reduce the palladous ions to palladium metal. The alkaline material is added to the reaction mixture in such amount whereby, in a preferred embodiment, the pH of the aqueous solution containing the metal ions is maintained at less than about 7, preferably from about 4 to about 7, more preferably from about 4.5 to about 5.5, still more preferably from about 4.8 to about 5, at all times prior to the reduction reaction. Suitable alkaline materials are those selected from the group consisting of hydroxides and carbonates of ammonia, of the alkali metals, of magnesium, of the alkaline earth metals and mixtures thereof such as sodium hydroxide, sodium carbonate, magnesium hydroxide, calcium hydroxide and the like. Preferably, an alkali metal hydroxide such as sodium hydroxide is employed.

During the reduction, it is preferable that the pH of the reaction mixture by maintained above about 7, preferably between from about 7 to about 9. Preferably, the reducing agent, and at least a portion of one of the alkaline materials suitable for the purposes of invention, is combined to form a reductant reagent. A preferred reducing agent can be made by treating an aqueous solution of formic acid with somewhat more than its neutralizing equivalent of sodium carbonate so that the finished solution of reductant comprises essentially sodium formate with a slight excess of sodium carbonate.

In accordance with the process described above, there is obtained a novel class of catalysts comprising, as sole catalytic components, reduced palladium metal deposited upon a substrate of iron hydroxides or iron carbonates or iron basic carbonates, the iron being present in its ferric condition. Inasmuch as substantially all of the palladium and the iron content of the starting material is precipitated (the palladium in the form of reduced metal and the iron in the form of basic compounds), the catalysts contain these two metals in substantially the same proportion as in the starting material.

A preferred procedure for preparing the catalyst suitable for the purposes of the present invention comprises dissolving, in water, a water soluble ferric salt and a water soluble palladous salt and adjusting the pH so as to precipitate the ferric iron present as a hydroxide. It is preferable to effect the precipitation by adjusting the pH to about 4.8–5.0 with one of the water soluble alkaline materials above identified. To the aqueous system containing the palladium and iron, a reducing agent is added taking care that the pH of the reaction mixture is greater than about 7. It is preferable to warm the reaction mixture, preferably above about 60°. The reducing agent is allowed to act until no further reduction takes place. The reaction is completed when all of the palladium has precipitated as evidenced by decolorization of the supernatant liquid. The precipitated catalyst is then filtered off and freed of most of its adhering water by washing the filter cake with a lower alkanol such as methanol.

With the aid of the catalyst, prepared as described above, the reduction of an anthranil such as compound III above can be efficaciously achieved under a wide variety of conditions. Preferably, the catalyst is employed in a range by weight of from about .1 percent to about 5 percent, more preferably from about .1 percent to about 1 percent, still more preferably from about .4 percent to above .8 percent per 100 parts by weight of anthranil.

Suitably, such reduction is effected in the presence of any suitable inert organic solvent. Representative of such inert organic solvent may be included lower alkanols such as methyl alcohol, ethyl alcohol and the like. It is preferable, when proceeding from Compound III to Compound IV, that the reaction be ended when the theoretical amount of hydrogen is absorbed. If the amount of hydrogen employed exceeds the theoretical amount, dehalogenation has been found to occur. This fact, it is postulated, evidences the selectivity of the novel catalyst of the present invention to effect ring opening of compounds of Formula III above rather than the dehalogenation thereof. Although temperature is not critical during this stage, it is preferred to operate within a temperature range of from about 30° to about 60°.

The compound of Formula II above, employed in the first stage of the hereinabove described process, may be obtained as such in ordinary commercial channels. Alternatively, it can be prepared and reacted after isolation or in situ with the compound of Formula I above. For example, a compound corresponding to the formula of:

wherein A is as above, can be reacted with a metal cyanide, e.g. an alkali metal cyanide such as sodium cyanide in the presence of any suitable solvent, for example, a lower alkanol such as methanol to which a small amount of water has been added. In an especially preferred aspect, a solvent mixture consisting of methanol and less than about 2 percent of water is utilized. The resultant product which is a compound of the Formula II above can then be isolated by conventional techniques for use in the first stage of the process. Alternatively, a compound corresponding to Formula I above can be added to a reaction mixture containing the product resulting from the reaction of a compound of Formula V above with the said metal cyanide (i.e. a compound of the Formula II above), and the resultant dispersion treated in the manner described above to form an anthranil of the Formula III above.

The following examples are illustrative but not limitative of the present invention. All temperatures are in degrees centigrade.

EXAMPLE 1

A 500 ml. flask equipped with a stirrer, a thermometer and a reflux condenser is charged with 22.4 g. of sodium hydroxide. 125 ml. of methanol is added and the mixture stirred and cooled to 20° C. 14.7 g. of phenylacetonitrile is then added to the flask followed by 21.7 g. of p-nitrochlorobenzene. The reaction medium is maintained at a temperature below 30° for 2 hours. The reaction is permitted to proceed at room temperature for an additional 16 hours. The batch is diluted with 250 ml. of water and stirred for about 15 minutes. The crude product is filtered off and the filter cake reslurried in another 250 ml. of water. The batch is filtered again and washed with 100 ml. of water. The crude, wet filtrate is suspended in 100 ml. of methanol and stirred for 15 minutes. The light, yellow-colored 3-phenyl-5-chloroanthranil is filtered off, washed on the filter with 50 ml. of methanol and dried at 75° C. to constant weight.

EXAMPLE 2

0.05 g. of ferric chloride hexahydrate is dissolved in 25 ml. of water. To the resultant solution is added 0.5 ml. of a palladous chloride solution containing 200 g. of palladium metal per liter of solution. The solution was adjusted to a pH of 4.8 with 1.5 ml. of 2 N sodium hydroxide. 3.0 ml. of sodium formate solution made from .330 g. of sodium carbonate monohydrate and .195 ml. of a formic acid solution containing 90 percent by weight of formic acid is added and the mixture heated with stirring to 85° until all of the catalyst is precipitated as a black flocculant, as evidenced by decolorization of the supernatant liquid. The reaction mixture is cooled, the supernatant liquid decanted, and the remaining suspension washed with water by decantation. The wet catalyst is transferred to a filter and 100 ml. of ethanol is poured through the filter cake to remove as much water as is possible. The filter cake is suspended in 10 ml. of ethanol and is kept in this condition until ready for use.

EXAMPLE 3

To a 500 ml. flask equipped with an agitator, a thermometer and a charge tube is added 25.0 g. of 3-phenyl-5-chloroanthranil and 150 ml. of ethyl alcohol. .2 g. of a catalyst containing as the sole catalytic components, palladium and iron in the proportion of 5 g. atoms of palladium to 1 g. atom of iron, suspended in ethanol as prepared above, is introduced into the flask. The flask is purged of air by flushing with nitrogen, sealed, and hydrogen is introduced with stirring to a pressure of 1.5 to 2.0 p.s.i. The hydrogenation of the said anthranil is an exothermic reaction and the temperature will rise to 40–45° C., and is maintained at this temperature level with a warm water bath. The reaction is stopped when 2.45 l. of hydrogen (about the theoretical amount) are taken up. The hydrogenation is completed in about 2 hours and then the catalyst is filtered off. After removal of the catalyst, the clear orange filtrate is evaporated under vacuum. The residue, which is 2-amino-5-chloro-benzophenone, is dried to constant weight at 75°.

EXAMPLE 4

To 250 ml. of methanol was added 90 g. of sodium hydroxide (commercial flakes) and the resultant mixture cooled to 5° in an ice bath. To the cooled mixture was added 21.7 g. of chloronitrobenzene and 14.7 g. of phenylacetonitrile. The reaction was allowed to proceed in an ice bath at 7 to 8° for 4 hours until the reaction was complete. To the reaction mixture was added 750 ml. of water. The reaction mass was filtered and the filter cake reslurried in 500 ml. of water. The resultant dispersion was dried at 75° for 48 hours to yield 3-phenyl-5-chloroanthranil.

EXAMPLE 5

0.10 g. of ferric chloride hexahydrate was dissolved in 50 ml. of water. .65 ml. of a palladous chloride solution (containing 200 g. of palladium metal per liter) was added and then the pH of the solution was adjusted to 5.1 by the addition of sufficient sodium hydroxide solution containing 80 g. per liter of sodium hydroxide. The reaction mixture was heated with stirring to 85° and 4.0 ml. of sodium formate solution was added with continued stirring (said sodium formate solution being made from .440 g. of sodium carbonate mono hydrate and .260 ml. of a formic acid solution containing 90 percent by weight of formic acid). The stirring and heating was continued until all of the catalyst had precipitated as a black flocculant, as evidenced by decolorization of the supernatant liquid. The reaction mixture was cooled and the supernatant liquid decanted. The remaining suspension was washed with water by decantation. The wet catalyst was transferred to a filter and 100 ml. of ethanol was poured through the filter cake to remove as much water as possible. The filter cake is suspended in 10 ml. of ethanol and is kept until ready for use.

EXAMPLE 6

26.3 g. of 3-phenyl-5-chloroanthranil and 150 ml. of ethyl alcohol are charged to a flask provided with an agitator, a thermometer and a charge tube. 0.13 g. of a palladium-iron catalyst suspended in ethyl alcohol, as prepared in Example 5, is introduced into the flask. The flask is purged of air by flushing with nitrogen, sealed, and hydrogen is introduced with stirring to a pressure of 1.5 to 2.0 p.s.i. Initially, the temperature will rise to 40° and is maintained at that level by a warm water bath. The reaction is stopped when 2.55 l. of hydrogen is absorbed (about the theoretical amount). The hydrogenation is completed in about 3 hours and the catalyst is filtered off. After removal of the catalyst, the solvent is stripped under vacuum. The remaining residue, which is 2-amino-5-chloro-benzophenone, is dried at 75° until constant weight.

EXAMPLE 7

90 g. of sodium hydroxide (commercial flakes) and 250 ml. of methanol is added to a 500 ml. flask fitted with a stirrer, a thermometer and a reflux condenser. The mixture is stirred and cooled to 20° when 14.7 g. of phenylacetonitrile is added thereto. Following the addition of the phenylacetonitrile, 21.7 g. of p-chloronitrobenzene is added. The reaction mixture is cooled to a temperature of 7° and maintained at this temperature for about 8 hours. 750 ml. of water are added to the reaction medium. The resultant dispersion is filtered and the filter cake reslurried in 500 ml. of water. Following drying at 75° to constant weight, there is obtained 3-phenyl-5-chloroanthranil.

EXAMPLE 8

0.1 g. of ferric chloride hexahydrate were dissolved in 25.0 ml. of water. 1.0 ml. of palladous chloride solution (containing 200 g. of palladium metal per liter of solution) was added and the pH of the solution adjusted to 5.5 with 2 N NaOH. The resultant dispersion was heated to 70° and 3.0 ml. of sodium formate solution made from .330 g. of sodium monocarbonate and .195 ml. of a formic acid solution containing 90° by weight of formic acid was added thereto. The heating was continued until all of the catalyst precipitated out as a black flocculant, as evidenced by decolorization of the supernatant liquid. The catalyst was made ready for use in the manner described in Example 2.

EXAMPLE 9

To 750 ml. of ethyl alcohol, there was added 8.0 g. of 3-phenyl-5-chloroanthranil. .2 g. of the catalyst, as prepared in Example 8, suspended in ethanol, was added to the anthranil-containing mixture. Hydrogen was bubbled through the solution for 3 hours at 50 to 55° at a pressure of 1.5–2.0 p.s.i. until the theoretical amount of hydrogen was absorbed. The catalyst was filtered off, the solution stripped of solvent and the residue dissolved in 30 ml. of ethanol and 2 ml. of water. The solution containing the dissolved residue is cooled and allowed to stand overnight in a freezer at a temperature of 0°. A crystalline material appeared which, upon decantation and drying, was found to be 2-amino-5-chlorobenzophenone.

EXAMPLE 10

A catalyst consisting of palladium on a substrate of iron hydroxide was prepared in the following manner: To 25.0 ml. of water, there was added 0.125 g. of ferric chloride hexahydrate. 1.0 ml. of palladous chloride solution (containing 200 g. of palladium metal per liter) was added and the pH was adjusted by the addition of 3 ml. of 2 N sodium hydroxide. Thereafter, 4.0 ml. of sodium formate formed from .440 g. of sodium monocarbonate and .260 ml. of a formic acid solution containing 90 percent by weight of formic acid was added while stirring. With continued stirring, the mixture was heated to 85°. The catalyst precipitated as a black flocculant substance with a strong evolution of $CO_2$. The catalyst was made ready for use as in Example 2.

EXAMPLE 11

0.2 g. of the Pd-Fe sponge, as prepared in Example 10, was added to a flask containing a mixture of 28.0 g. of 3-phenyl-5-chloroanthranil and 225.0 ml. of ethyl alcohol. The flask was purged of air by flushing with nitrogen and then sealed. Hydrogen was introduced with stirring to a pressure of 1.5 p.s.i. The hydrogenation was conducted with continued stirring at a temperature of 52° to 55° for a period of 1½ hours, at the end of which time 2.75 l. of hydrogen were absorbed. The catalyst was filtered off, the solution stripped of solvent and the residue dissolved in 100 ml. of ethanol. The solution is placed in a freezer and allowed to stand until a crystalline material appears. The supernatant liquid is decanted and the residue is washed with cold isopropyl alcohol. On drying the residue at 75°, 2-amino-5-chloro-benzophenone is obtained.

EXAMPLE 12

0.15 g. of ferric chloride hexahydrate was dissolved in 25 ml. of water. 1.0 ml. of a palladous chloride solution (containing 200 g. of palladium metal per liter) was added and then the pH of the solution was adjusted to 5.5 with sodium hydroxide. The solution was heated to 70° and 4.0 ml. of sodium formate solution, prepared as in Example 10, was added with stirring. The stirring was continued while raising the temperature to 90° until all of the catalyst precipitated out as a black flocculant, as evidenced by the decolorization of the supernatant liquid. The catalyst was made ready for use as in Example 2.

EXAMPLE 13

A 500 ml. flask equipped with a stirrer, a thermometer and a charge tube is charged with 250 ml. of ethyl alcohol. To the so-charged flask is added 28.4 g. of 3-phenyl-5-chloroanthranil. 0.2 g. of a palladium-iron catalyst, as prepared in Example 12, is introduced into the flask. The flask is purged of air by flushing with nitrogen, sealed, and hydrogen is introduced through the charge tube to a pressure of 2 p.s.i. The reaction mixture is stirred and the temperature is maintained at 53°–55°. The reaction is stopped when 2.85 l. of hydrogen are taken up. The hydrogenation is completed in about 1 hour. The catalyst is removed and the solution stripped of solvent. A black residue remains as an oil. The oil is dissolved in 75 ml. of isopropyl alcohol and is left to crystallize overnight in a freezer at a temperature of 0°. The crystalline material was separated and is dried at 75° to constant weight to give 2-amino-5-chloro-benzophenone.

EXAMPLE 14

0.050 g. of ferric chloride hexahydrate was dissolved in 25 ml. of water. 0.12 g. of palladous chloride solution containing 200 g. of palladium metal per liter was added and the pH of the resulting solution was adjusted to 6 with 2 N aqueous sodium carbonate solution. The reaction mixture was heated to 90° and 3.0 ml. of sodium formate solution made from .330 g. of sodium mono-carbonate and .195 ml. of formic acid containing 90 percent by weight of formic acid was added with stirring. With continued stirring, the mixture was heated to 85°. The catalyst precipitated as a black flocculant and was made ready for use as in Example 2.

EXAMPLE 15

To a solution containing 150.0 ml. of ethyl alcohol and 24.1 g. of 3-phenyl-5-chloroanthranil was added 0.12 g. of a palladium-iron catalyst as prepared in Example 14. Hydrogen was introduced with stirring into the reaction medium to a pressure of 1.75 p.s.i. The temperature during the hydrogenation was maintained at 55°. The reaction stopped when 2.3 l. of hydrogen were absorbed. The catalyst was removed and the solvent stripped under vacuum. A dry, dark yellow residue remained. This residue was dried at 75° to constant weight giving 2-amino-5-chloro-benzophenone.

EXAMPLE 16

19.0 g. of benzyl chloride and 9.8 g. of finely divided sodium cyanide were added to a solvent mixture containing 100.0 ml. of methanol and 1.0 ml. of water. The reaction mixture was refluxed with stirring for 3 hours, cooled to 10° in an ice bath and 22.4 g. of sodium hydroxide flakes were carefully added. The temperature of the reaction mixtures was kept below 35° by cooling in an ice bath. There was then added to the reaction mixture 20.0 g. of p-nitrochlorobenzene. The heat of the reaction was considerable and ice cooling was employed to maintain the temperature below 35°. After about 1 hour, no appreciable rise in temperature was observed. The ice bath was then removed and the reaction permitted to proceed overnight at room temperature. The total reaction time involved was 18 hours. To the reaction mixture was added 1000 ml. of cold water with stirring. The aqueous dispersion resulting was filtered and washed with 500 ml. of water. The wet cake was resludged with 120 ml. of methanol. This mixture was filtered, washed with cold methanol and dried to constant weight at 75°. The product was 3-phenyl-5-chloroanthranil.

The 3-phenyl-5-chloroanthranil obtained was treated with .2 g. of a catalyst, as prepared in Example 2, in the manner fully described in Example 3 whereby to obtain 2-amino-5-chlorobenzophenone.

EXAMPLE 17

A mixture of 290.2 g. of para bromonitrobenzene and 11.8 g. of 2-pyridyl-acetonitrile was added to a solution of 20 g. of sodium hydroxide in 300 ml. of methanol. The solution was heated under reflux for 7 hr. and then the reaction mixture was poured into 1.5 l. of cold water. The solution was allowed to stand overnight (18 hr.). A precipitate which formed was removed by filtration, washed with water, and dissolved in dichloromethane. The organic solution was dried over anhydrous sodium sulfate and chromatographed over 100 g. of diatomaceous earth. Eluting the column with 1 l. of dichloromethane and concentrating the eluate gave 5-bromo-3-(2-pyridyl)-anthranil melting at 166–169°. Recrystallization from hexane or ether gave the product as white prisms melting at 168–170°.

EXAMPLE 18

A mixture of 68 g. of para chloronitrobenzene and 51.1 g. of 2-pyridyl-acetonitrile was added to a solution of 80 g. of sodium hydroxide in 1.5 l. of methanol. The resulting mixture was stirred and heated under reflux for 7 hr., and then poured into 6 l. of water. After standing overnight, a precipitate formed which was separated by filtration. The precipitate was washed well with water and dissolved in dichloromethane. The solution was dried over anhydrous sodium sulfate and chromatographed over neutral Grade I alumina using dichloromethane as the eluent. Concentration of the eluate and recrystallization of the residue from methanol gave 5-chloro-3-(2-pyridyl) anthranil as white prisms melting at 158–159°.

EXAMPLE 19

A solution of 6.55 g. of 5-bromo-3-(2-pyridyl)-anthranil in 50 ml. of methanol was hydrogenated at atmospheric pressure and room temperature in the presence of .05 g. of a palladium catalyst prepared as in Example 2. The reaction was terminated after slightly more than a molar equivalent of hydrogen had been absorbed. The catalyst was removed by filtration. The yellow-brown solution was concentrated, dissolved in benzene and chromatographed over 40 g. of silica. Using 1 l. of benzene, 1 percent ether as the eluent, a forerun was discarded. Changing the eluent to 1 l. of benzene, 5 percent of ether gave, on concentration of the solvent, 2-(2-amino-5-bromobenzoyl)pyridine as yellow prisms melting at 96–99°.

EXAMPLE 20

A mixture of 600 mg. of 5-chloro-3-(2-pyridyl) anthranil in 5 ml. of ethanol was hydrogenated at atmospheric pressure and room temperature employing 5 mg. of a palladium catalyst as prepared in Example 2. 2-(2-amino-5-chlorobenzoyl) pyridine was isolated in the manner fully set out in Example 19 above.

EXAMPLE 21

A 1.0 liter round-bottom flask, provided with stirrer, thermometer, and reflux condenser, is charged with 180.0 g. of sodium hydroxide kakes (4.5 mols) and 450.0 ml. of methanol. Agitation is started, and the temperature rose rapidly to 70–72° C. (reflux). When most of the NaOH has dissolved and the temperature begins to fall, the batch is cooled to 20° C. with an ice-bath. Then 38.0 g. of p-chlorophenylacetonitrile (0.25 mol) are introduced into the reaction flask, followed by the addition of a warm solution (45° C.) of 43.4 g. p-nitrochlorobenzene (0.276 mol) in 250.0 ml. of methanol. For the first two hours, the reaction mixture has to be cooled in order to keep the temperature below 30° C. After two hours, the cooling bath is removed and the reaction allowed to continue at room temperature (25–26° C.) for a period of period of 18 hours.

After the reaction has run its full 18 hours, the batch is diluted with 3.0 liters of tap water. The precipitate is filtered off and washed on the filter with 2.5 liters of tap water. The cake is filtered as dry as possible. The moist cake is slurried with 300 ml. of methanol, filtered again, and washed on the filter with 100 ml. of methanol yielding 3-(p-chlorophenyl)-5-chloroanthranil. The product is air-dried and dissolved in 1200 ml. of chloroform at the boiling point (61° C.). The clear, brown solution is allowed to crystallize overnight at 0° C. The brown, needle-like crystals are filtered off, washed on the filter with 90 ml. of chloroform, and then dried at 75° C. to constant weight yielding 3-(p-chlorophenyl)-5-chloroanthranil, of M.P. 210.2–211.5° C. (corr.)

EXAMPLE 22

A 500 ml. round-bottom flask, provided with agitator, thermometer, and charging tube, is charged with 16.0 g. of 3-(p-chlorophenyl)-5-chloroanthranil, 150.0 ml. of methanol, 6.0 g. of diethylamine and 0.2 g. of Pd-Fe catalyst as prepared in Example 2.

The flask is purged of air by flushing with nitrogen, and finally with hydrogen. The flask is then sealed. Hydrogen is introduced through the charging tube to a pressure of 1.5 to 2.0 p.s.i. Agitation is started and the absorption of hydrogen measured as accurately as possible. The reduction is run at a temperature of 40–45° C. by means of a warm water bath. When the required amount of hydrogen has been absorbed, the reaction is stopped. The catalyst and some insoluble material are filtered off. The clear yellow filtrate is concentrated under vacuum to incipient crystallization. The bath is left to crystallize overnight at 0° C.

The pure crystals are filtered off, washed on the filter with 25.0 ml. of cold methanol (0° C.) and the so-formed 2-amino-5,4'-dichlorobenzophenone after drying to constant weight was found to have a melting point of 116.0–117.2° C. (corr.).

I claim:
1. A compound of the formula

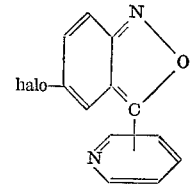

2. A compound as in claim 1 wherein said compound is 2-halo-3-(2-pyridyl) anthranil.
3. 2-bromo-3-(2-pyridyl) anthranil.
4. 2-chloro-3-(2-pyridyl) anthranil.

References Cited

UNITED STATES PATENTS 3,156,704  11/1964  Davis _____ 260—465 XR

OTHER REFERENCES

Fieser and Fieser, Advanced Organic Chemistry, Reinhold, p. 365 (1961).

Walker, Journal of Organic Chemistry, vol. 27, pp. 1920–30 (1962).

HENRY R. JILES, *Primary Examiner.*

A. L. ROTMAN, *Assistant Examiner.*

U.S. Cl. X.R.

252—443, 447; 260—294.9, 570